(No Model.)
J. RILING.
FASTENER FOR GLASS OR OTHER VESSELS.
No. 533,086. Patented Jan. 29, 1895.
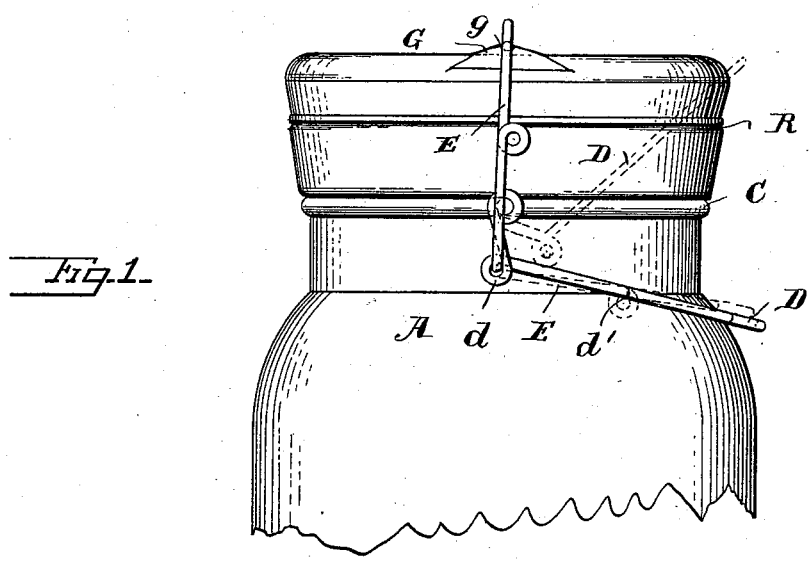
Fig. 1.
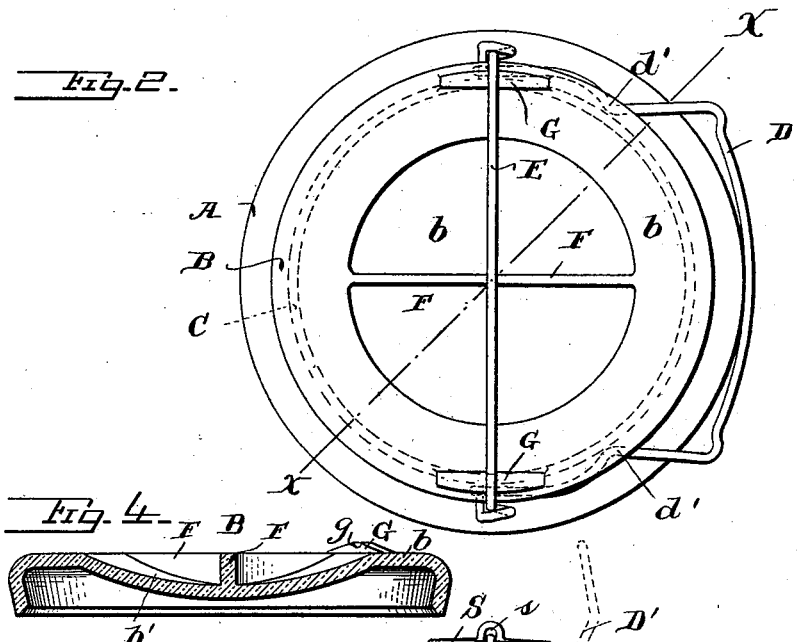
Fig. 2.
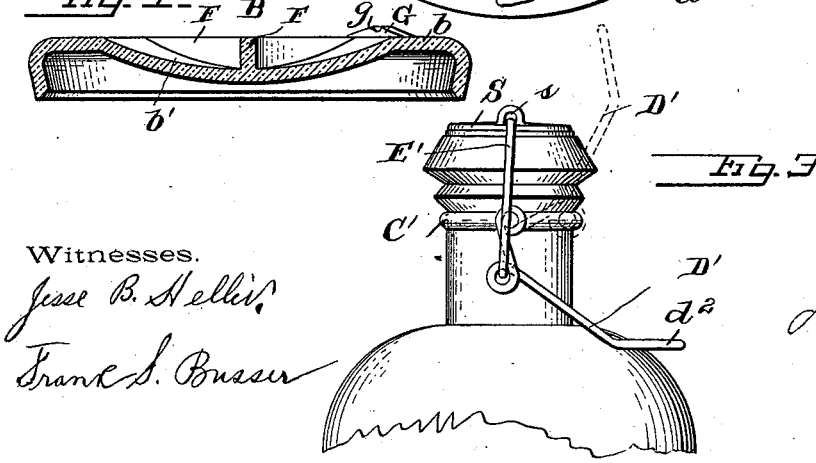
Fig. 4.
Fig. 3.
Witnesses.
Jesse B. Heller
Frank S. Busser
Inventor.
Joseph Riling
by J. S. Harding
Attorney.

UNITED STATES PATENT OFFICE.

JOSEPH RILING, OF PHILADELPHIA, PENNSYLVANIA, ASSIGNOR TO SALMON B. ROWLEY, OF SAME PLACE.

FASTENER FOR GLASS OR OTHER VESSELS.

SPECIFICATION forming part of Letters Patent No. 533,086, dated January 29, 1895.

Application filed October 17, 1894. Serial No. 526,164. (No model.)

*To all whom it may concern:*

Be it known that I, JOSEPH RILING, a citizen of the United States, residing at Philadelphia, county of Philadelphia, and State of Pennsylvania, have invented a new and useful Improvement in Fasteners for Glass or other Vessels, of which the following is a full, clear, and exact description, reference being had to the accompanying drawings, which form a part of this specification.

My invention relates generally to glass vessels and fastening devices therefor, and its object is to remove certain defects to be hereinafter enumerated in the fastening devices of most ordinary commercial use. This latter device consists of a glass lid or cover in jars, and of a rubber stopper in bottles, combined with a bail or yoke extending over the lid or stopper, the ends of which are attached to a neck-wire surrounding the neck of the vessel, and a lever secured to both bail and neck-wire in such manner that when the lever and bail are depressed the lid or stopper will be held tightly against the neck of the vessel.

My improvement is designed to be more especially applicable to a particular type of the general class just described, which particular type is shown and described in Letters Patent No. 515,579, dated February 27, 1894, and my invention is herein shown and described in connection with such type of fastener, although it may with advantage be applied to other forms of fasteners.

In the drawings, Figure 1 is a side view of a jar with my improved fastener in operative position thereon; Fig. 2, a plan view of same, showing also my improved construction of lid; Fig. 3, a side view of a bottle with my fastening device (modified) in operative position thereon; and Fig. 4 a section of the cap or lid on line *x—x*, Fig. 2.

In Figs. 1 and 2, A is the jar body; B, the lid having the raised edge *b* and the depressed central portion *b'*. C is the neck-wire, to which is pivoted the compressing lever D, the bail E having inturned ends engaging loops *d* of the lever D.

In Fig. 3, S represents the stopper having an eyelet *s* through which extends the bail E'. C' is the neck-wire and D' the lever.

The position of the bail when it is in its inoperative position, and the position of the lever before it is depressed and after the bail is in operative position, are shown in dotted lines, Fig. 1.

In fasteners of the general type enumerated, especially in those used on jars, the shape and size of the compressing lever are such that when this lever is released, the considerable manual force used to effect the release, combined with the elasticity of the lever, will cause the lever to strike with considerable force the lid of the bottle, often breaking or cracking it. To obviate this I have bent in the side portions *d'* of the lever, near their point of union with the bail (see Fig. 2) in such manner that when the lever is released, not only is the blow sustained wholly by the neck of the vessel, instead of by the lid, but the neck itself will be struck, not a direct blow, but a sidewise or glancing blow, thus altogether removing the risk of breakage; and when the lever is depressed the inbent part of lever will alone engage the body of the vessel. It has also been observed that inexperienced or careless users of the fastening device will often, in attempting to operate the fastening device, confuse in their minds the bail and lever, owing to their similarity of shape, and because, also, when the fastener is in its inoperative position, the bail and yoke rest on the same side of the vessel. The result is that the operator sometimes attemps to raise the lever, instead of the bail, up over the lid of the vessel. My construction prevents this, as the engagement of the side portions of the lever with the neck limits its upward movement. I make the lever, however, of sufficient length to engage the bail when the latter is dropped to its inoperative position, so that the lever cannot be raised without at the same time lifting the bail.

By bending the side portions of the lever inward, so that for about half their extent they will lie substantially concentric with the bottle and for the rest of their extent be bent at a sharp angle outwardly, a ready means of grasping the lever will be afforded.

The lid of a jar is usually made with a raised edge or circumferential portion and a depressed central portion, concave in shape.

It has been found in practice, first, that when taken from the mold in a heated condition, the central portion is apt to sink, and sink irregularly; and, secondly, that the strain or pressure of the bail upon the lid is apt to break or crack it. To cure both these defects, I make the lid with preferably two or more intersecting ridges, F, connecting opposite sides of the raised edge, the top of the ridges being substantially flush with the surface of the raised edge. This construction will support the depressed center in the cooling process and will strengthen the lid to such an extent as to absolutely prevent breakage, besides adding to the appearance of the lid.

Instead of providing the raised part of the lid with two pairs of "beads" to hold the bail in place, I substitute two ridges, G, sloping at their ends and having a central depression g, which forms a seat for the bail when the latter is in operative position. The ridges, as thus constructed, form cams, upon which the bail slides when moved into an operative position. When the bail rests in its seat, it will exert a slight pressure upon the lid and cannot be accidentally dislodged even when the lever is not depressed. These inclined ridges G I locate near the extreme edge of the lid, that is, immediately over the shoulder R or bearing surface of the neck of the jar or bottle. I have found by experiment that unless these ridges G are located as described, the great pressure of the bail upon the lid, which must sustain the whole pressure, is apt to break it. By placing the ridges on that part of the lid immediately over the bearing surface or shoulder R, of the neck, the pressure is upon the thick overhanging or flanged part of the lid and besides, instead of being sustained wholly by the lid, is sustained to a great extent by the shoulder R, thereby entirely removing the risk of breakage of the lid.

The lever illustrated in Fig. 3 (applied to a bottle fastener) is also capable of being readily grasped to release it, as it is provided with the upturned portion $d^2$, which, when the lever is depressed, projects out from the surface of the bottle. The side portions of the lever are also adapted to engage the neck of the vessel when the lever is uplifted, as shown in dotted lines, Fig. 3.

Having now fully described my invention, what I claim, and desire to protect by Letters Patent, is—

1. In a fastener for glass and other vessels, the combination with a bail and neck-wire, of a lever pivoted to them, said lever consisting of the side members bent inwardly near their central parts and outwardly toward their outer ends and a central member connecting the two side members, said lever being of such width and proportion that when it is swung upward the side members will engage the neck at the junction of their inwardly and outwardly bent portions only, and when dropped downward the lever will form a support for the bail, substantially as described.

2. In a fastener for glass and other vessels, the combination with a bail and neck-wire, of a lever pivoted to them, said lever consisting of the side members bent inwardly near their central parts and outwardly toward their outer ends and a central member connecting the two side members, said lever being of such width and proportion that when it is swung upward and downward, the central member will be free from the vessel and the side members engage respectively the neck and body of the vessel at the junction of their inwardly and outwardly bent portions only, substantially as described.

3. In a fastener for glass and other vessels, the combination with a bail and neck-wire, of a lever pivoted to them, said lever consisting of the side members bent inwardly near their central parts and outwardly toward their outer ends and a central member connecting the two side members, said lever being of such width and proportion that when it is swung upward and downward the central member will be free from the vessel, and the side members engage respectively the neck and body of the vessel, at the junction of their inwardly and outwardly bent portions only substantially as described, and when both bail and lever are depressed, the latter will form a support for the former.

In testimony of which invention I have hereunto set my hand.

JOSEPH RILING.

Witnesses:
FRANK S. BUSSER,
PHILIP BOUTELJE.